Jan. 24, 1950 — H. P. SHAW — 2,495,553
PASTRY MARKER
Filed Dec. 19, 1945 — 2 Sheets-Sheet 1
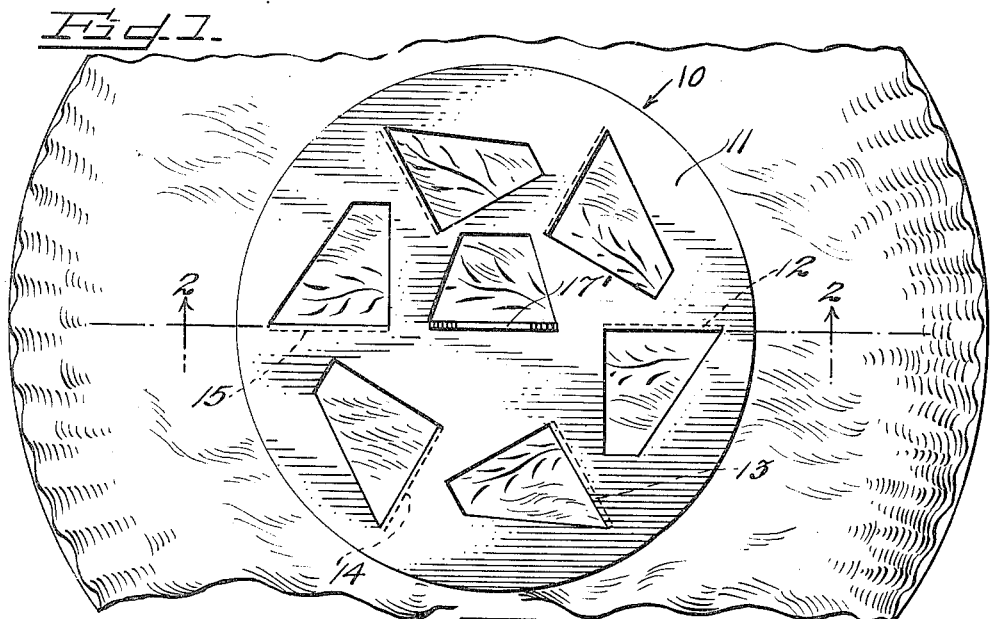
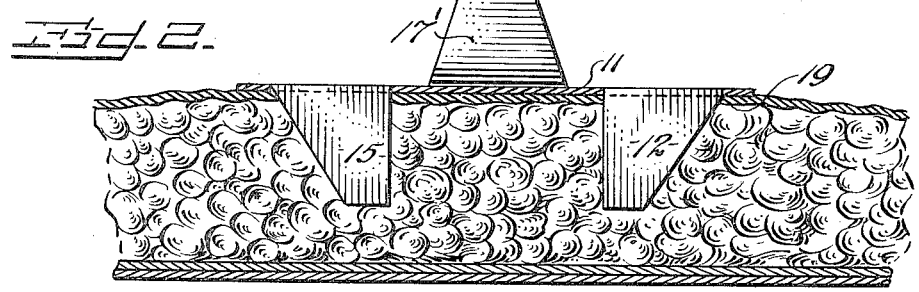
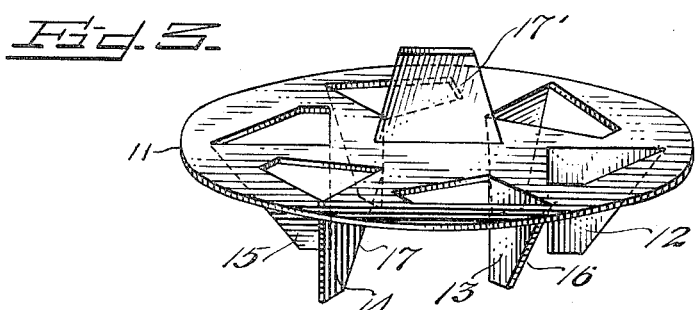
Inventor
HARRY P. SHAW,
By Clarence A. O'Brien
and Harvey B. Jacobson
Attorneys Jan. 24, 1950     H. P. SHAW     2,495,553
PASTRY MARKER
Filed Dec. 19, 1945     2 Sheets-Sheet 2
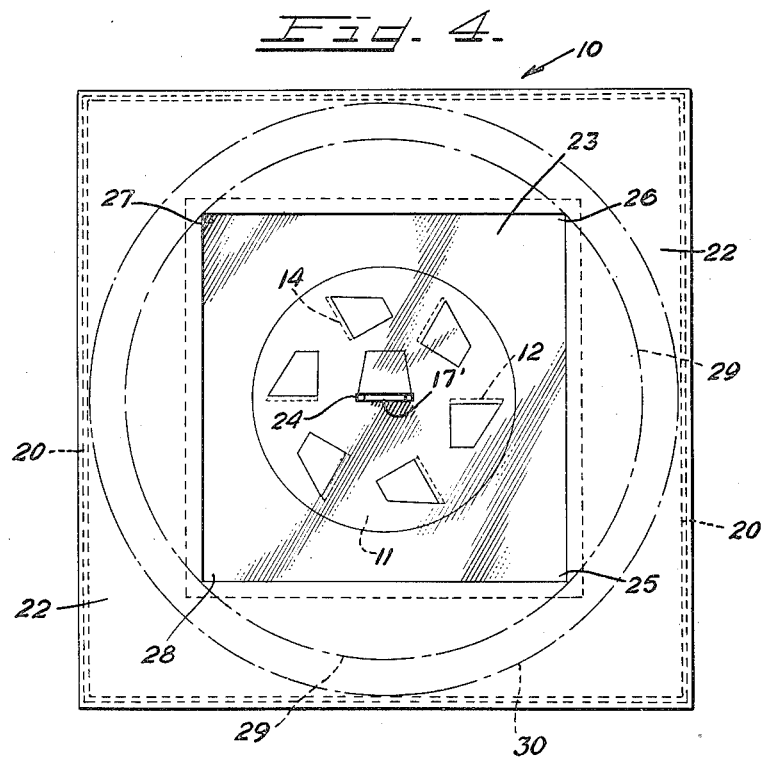
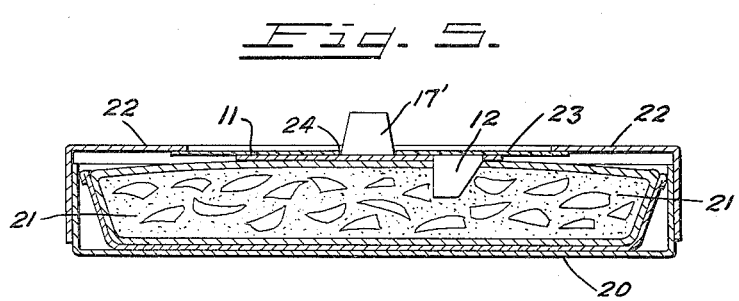
Inventor
HARRY P. SHAW
By *Clarence A. O'Brien and Harvey B. Jacobson*
Attorneys Patented Jan. 24, 1950

2,495,553

UNITED STATES PATENT OFFICE 2,495,553

PASTRY MARKER

Harry P. Shaw, Shelburne Falls, Mass.

Application December 19, 1945, Serial No. 635,926

2 Claims. (Cl. 107—47)

This invention relates to culinary articles and has for its object to provide a marker for pies and the like by means of which the pie when baked is laid off into a series of equally spaced segments to indicate where cuts may be made.

Another object of my invention is to provide a device for projecting into a pie which will with one operation plot the pie top into equally divided segments.

A further object of the invention is to provide a pie slice marker and means whereby the same may be exactly centered upon pies of different diameters.

Other features and advantages will become more readily apparent from the following description and the accompanying illustrative drawings in which:

Figure 1 is a top plan diagrammatic view of a part of a pie having my invention applied thereto, Figure 2 is a sectional view taken on line 2—2 thereof, Figure 3 is a perspective view of my pie marker, Figure 4 is a top plan view of my device showing its adjusting member, and Figure 5 is a transverse sectional view thereof.

In the accompanying drawings as above enumerated and in the following specification, like characters of reference indicate like parts throughout and in which 10, indicates my invention which consists of a disk 11, from which is struck a series of blades 12, 13, 14, 15, etc., which are turned down at right angles to the disk and each of which is provided with an inclined edge 16, 17, etc. There is also struck from the disk 11, a handhold 17', which is turned up at right angles centrally of the disk and by means of which the disk is held and operated. All the members 12 to 15, etc., are spaced somewhat from the marginal periphery of the disk. Preferably this device is of about half the diameter of the usual size pie and is adapted to be pressed down into the pie as indicated in Figure 2 of the drawings in order to provide therein equally spaced cuts 19, whereby when the member 11, is withdrawn, it will be clearly seen just where to make cuts to divide the pie into equal portions.

In order to exactly center the above described marker upon the pie I provide a box 20, of a size to hold a large pie 21. For the container I also provide a lid 22, provided with a cellophane window 23, in the top of the lid and in said window is a slot 24, through which the handhold 17', projects. In case a pie in the box is of smaller diameter than the width of the box, the pie can be centered by means of the four corners 25, 26, 27 and 28, of the windows, which is of a size to have these corners reach the periphery of the smaller pie, as indicated by the dotted line 29. When a larger standard size pie is used in the device, the periphery thereof will be disposed as schematically indicated at 30.

It is to be noted that the blades 12 to 15, cut vents in the pie into which a knife may be projected to sever the slices thereof.

Changes in shape, size and rearrangement of details and parts such as come within the purview of the invention claimed may be resorted to, in actual practice, if desired.

Having now described my invention that which I claim as new and desire to procure by Letters Patent is:

1. In a pie marking apparatus, a receptacle for a pie plate, a cover detachably secured on said receptacle, means for cuttingly marking a pie positioned in the pie plate including a monobloc flat base having blades extending from one surface thereof and a holding tongue extending from the opposite surface of said base and passed through said cover.

2. In a pie marking apparatus, a rectangular receptacle, a rectangular cover detachably secured to said receptacle, means for cuttingly marking a pie positioned in said receptacle including a monobloc base disposed below said cover and within said receptacle and having blades extending therefrom and means for centering said base relative to said cover, said last means including a tongue protruding from said base in the opposite direction from said blades, and a slot in said cover receiving said tongue therethrough whereby said tongue may be grasped as a handle.

HARRY P. SHAW.

REFERENCES CITED

The following references are of record in the file of this patent:

UNITED STATES PATENTS

| Number | Name | Date |
|---|---|---|
| 1,202,496 | Erickson | Oct. 24, 1916 |
| 1,377,974 | Simpson | May 10, 1921 |
| 1,474,640 | Pinkosh | Nov. 20, 1923 |
| 1,519,752 | Bannister | Dec. 16, 1924 |
| 1,797,070 | Brown | Mar. 17, 1931 |
| 1,808,788 | Proos | June 9, 1931 |
| 1,834,718 | Lastomirsky et al. | Dec. 1, 1931 |